(12) United States Patent
Epstein et al.

(10) Patent No.: US 6,327,343 B1
(45) Date of Patent: Dec. 4, 2001

(54) SYSTEM AND METHODS FOR AUTOMATIC CALL AND DATA TRANSFER PROCESSING

(75) Inventors: Mark Edward Epstein, Katonah; Dimitri Kanevsky, Ossining, both of NY (US); Stephan Herman Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/008,124

(22) Filed: Jan. 16, 1998

(51) Int. Cl.$^7$ .................................................. H04M 1/64
(52) U.S. Cl. ................................... 379/88.01; 379/88.13; 379/88.22
(58) Field of Search .............................. 379/88.01, 88.02, 379/88.03, 88.04, 88.05, 88.06, 88.13, 88.19, 88.2, 88.21, 88.22, 90.01; 704/270

(56) References Cited

U.S. PATENT DOCUMENTS

| | | | |
|---|---|---|---|
| 5,199,080 | 3/1993 | Kimura et al. | 381/110 |
| 5,479,490 | 12/1995 | Nakashima | 379/74 |
| 5,594,789 | 1/1997 | Seazholtz et al. | 379/207 |
| 5,604,790 | 2/1997 | Grimes | 379/67 |
| 5,608,784 | 3/1997 | Miller | 379/88 |
| 5,621,849 | 4/1997 | Sakurai et al. | 395/2.5 |
| 5,752,186 | * 5/1998 | Malackowski et al. | 455/414 |
| 5,999,611 | * 12/1999 | Tatchell et al. | 379/211 |
| 6,052,439 | * 4/2000 | Gerszberg et al. | 379/88.01 |
| 6,064,963 | * 5/2000 | Gainsboro | 379/88.01 X |
| 6,088,428 | * 11/2000 | Trandal et al. | 379/88.02 |

FOREIGN PATENT DOCUMENTS

| | | |
|---|---|---|
| 62-139491 | 6/1987 | (JP) . |
| 8-331618 | 12/1996 | (JP) . |

* cited by examiner

Primary Examiner—Scott L. Weaver
(74) Attorney, Agent, or Firm—F. Chau & Associates, LLP (57) ABSTRACT

A programmable automatic call and data transfer processing system which automatically processes incoming telephone calls, facsimiles and e-mails based on the identity of the caller or author, the subject matter of the message or request, and/or the time of day, which includes: a central server for automatically answering an incoming call and collecting voice data of a caller; a speaker recognition module connected to the server for identifying the caller or author; a switching module responsive to the speaker recognition module for processing the call or message in accordance with a pre-programmed procedure based on the identification of the caller or author; and a programming interface for programming the server, speaker recognizer module and the switching module. The system is programmed by the user to so as to process incoming telephone calls or e-mail and facsimile messages based on the identity of the caller or author, subject matter and content of the message and the time of day. Such processing includes, but is not limited to, switching the call to another system, forwarding the call to another telephone terminal, placing the call on hold, or disconnecting the call. In another aspect of the present invention, the system may be employed to process information retrieved from other telecommunication devices such as voice mail, facsimile/modem or e-mail. The system is capable of tagging the identity of a caller or participants to a teleconference, and transcribing the teleconferences, phone conversations and messages of such callers and participants. The system can automatically index or prioritize the received calls, messages, e-mails and facsimiles according to the caller identification or subject matter of the conversation or message, and allow the user to retrieve messages that either originated from a specific source or caller or retrieve calls which deal with similar or specific subject matter.

40 Claims, 4 Drawing Sheets

SYSTEM AND METHODS FOR AUTOMATIC CALL AND DATA TRANSFER PROCESSING

BACKGROUND OF THE INVENTION

The present invention relates to a system and methods for providing automatic call and data transfer processing and, more particularly, to a system and methods for providing automatic call and data transfer processing according to a pre-programmed procedure based on the identity of a caller or author, the subject matter and content of a call or message and/or the time of day of such call or message.

Generally, in the past, call processing has been manually performed either by a business owner, a secretary or a local central phone service. There are certain conventional devices which partially perform some call processing functions. For example, conventional answering machines and voice-mail services record incoming telephone messages which are then played back by the user of such devices or services. In addition, desktop-telephone software or local PBXs (private branch exchange) provide telephone network switching capabilities. These conventional answering machines, voice-mail services and switching systems, however, are not capable of automatically performing distinct processing procedures that are responsive to the identity of the caller or evaluating the content or subject matter of the call or message and then handling such call or message accordingly. Instead, the user must first answer his or her telephone calls manually, or retrieve such calls from an answering machine or voice-mail, and then decide how to proceed on a call-by-call basis. The present invention eliminates or mitigates such burdensome manual processing.

Moreover, although protected by Dual Tone Multi-Frequency (DTMF) keying, answering machines and voice-mail services are unable to identify or verify the caller when being remotely accessed or re-programmed by a caller with a valid personal identification number (PIN) which is inputted by DTMF keys. Further, conventional teleconference centers also rely on DTMF PINs for accessibility but are unable to verify and tag the identity of the speaker during a teleconference. Such answering machines, voice-mail and teleconference centers may therefore be breached by unauthorized persons with access to an otherwise valid PIN.

SUMMARY OF THE INVENTION

It is therefore an object of the present invention to provide a system and methods for automatic call and data transfer processing in accordance with a pre-determined manner based on the identity of the caller or author, the subject matter of the call or message and/or the time of day.

It is another object of the present invention to provide a call processing system which can first transcribe messages received by telephone, facsimile and email, as well as other data electronically received by the system, then tag the identity of the caller (or participants to a teleconference) or the author of such e-mail or facsimile messages, and then index such calls, conversations and messages according to their origin and subject matter, whereby an authorized user can then access the system, either locally or remotely, to playback such telephone conversations or messages or retrieve such e-mail or facsimile messages in the form of synthesized speech.

It is yet another object of the present invention to provide a system that is responsive (i.e., accessible and programmable) to voice activated commands by an authorized user, wherein the system can identify and verify the user before allowing the user to access calls or messages or program the system.

In one aspect of the present invention, a programmable automatic call and message processing system comprises: server means for receiving an incoming call; speaker recognition means, operatively coupled to the server means, for identifying the caller; speech recognition means, operatively coupled to the server means, for determining subject matter and content of the call; switching means, responsive to the speaker recognition means and speech recognition means, for processing the call in accordance with the identity of the caller and/or the subject matter of the call; and programming means, operatively coupled to the server means, speaker recognition means, speech recognition means and the switching means for programming the system to perform the processing.

The system is preferably programmed by the user so as to process incoming telephone calls in a predetermined manner based on the identity of the caller. Such processing includes, but is not limited to, switching the call to another system, forwarding the call to another telecommunication terminal, directing the call to an answering machine to be recorded, placing the call on hold, or disconnecting the call.

In another aspect of the present invention, the system may be pre-programmed to process an incoming telephone call, facsimile or e-mail message according to their content, subject matter, or according to the time of the day they are received. Still further, the system may preferably be programmed to process an incoming telephone call, facsimile or e-mail message according to a combination of such factors, i.e., the identity of the caller, the subject matter and content of the call and the time of day. In addition, e-mail messages (and other messages created by application specific software such as LOTUS NOTES) may be processed in accordance with mood stamps, i.e., informational fields provided by certain mailing programs such as LOTUS NOTES which allow the sender to indicate the nature of the message such as the confidentiality or urgency of the message. For future e-mail or data exchange techniques, such information can be included in a header of the email or facsimile. Further, the system may be programmed to prompt the caller to explicitly advise the system of the nature of the message. Still further, the system may be configured to retrieve and process data from other telecommunication devices such as voice mail systems or answering machines.

In still a further aspect of the present invention, the call processing system of the present invention is capable of tagging the identity of a caller or the participants to a teleconference, while transcribing the message or conversations of such callers and participants. Consequently, the system can automatically manage telephone messages and conversations, as well as voice mail, e-mail and facsimile messages, by storing such calls and messages according to their subject matter or the identity of the caller or author, or both. Specifically, the present invention can, in combination with such identification and transcription, automatically index or prioritize the received telephone calls and e-mail and facsimile messages according to their origin and/or subject matter which allows an authorized user to retrieve specific messages, e.g., those messages that originated from a specific source or those which deal with similar or specific subject matter.

In another aspect of the present invention, the system includes text-to-speech capabilities which allows the system to prompt (i.e., query) the user or caller in the form of synthesized speech, to provide answers to questions or requests by the user or caller in synthesized speech and to playback e-mail and facsimile messages in synthesized speech. The system also includes playback capabilities so as to playback recorded telephone messages and other recorded audio data.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
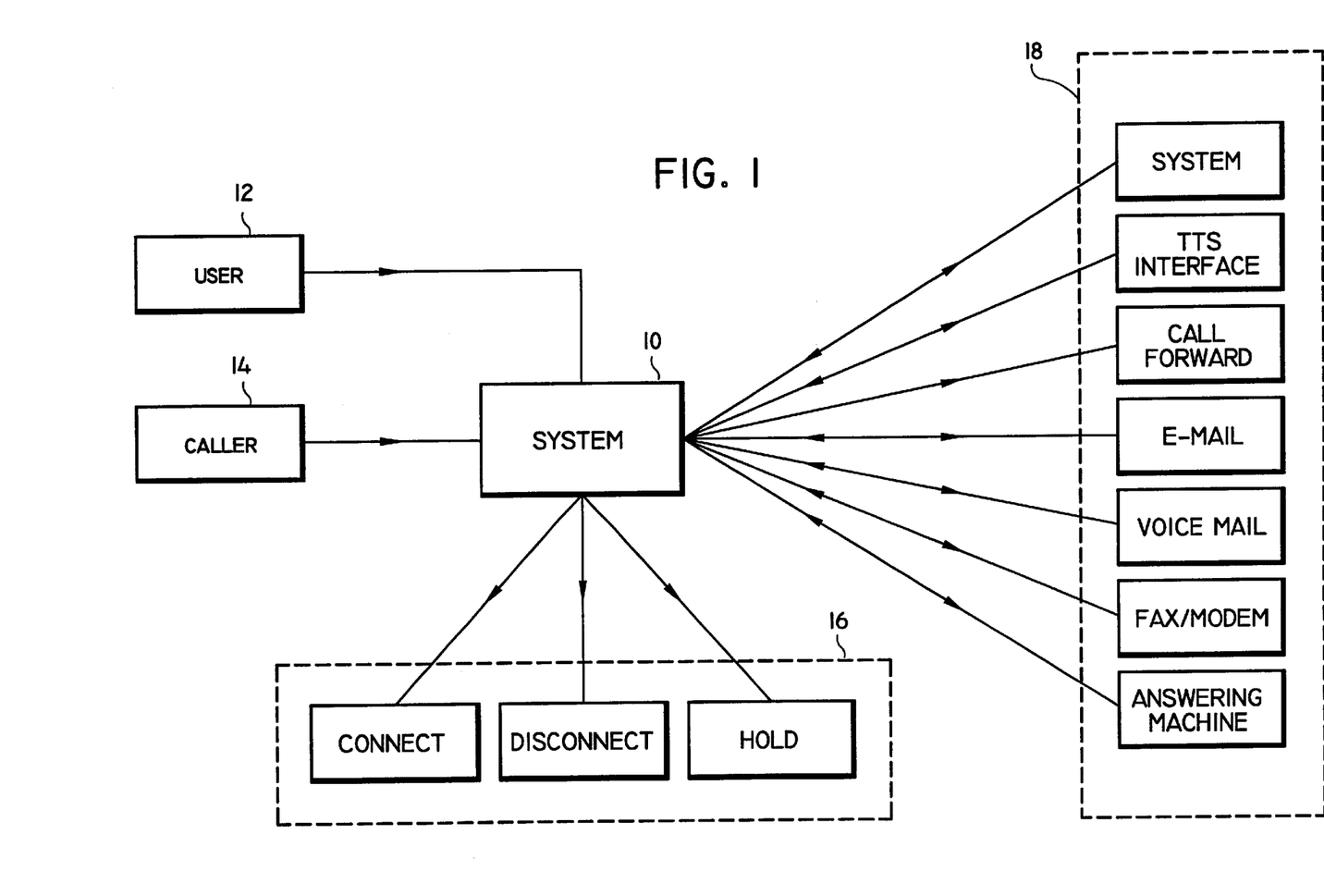
FIG. 1 is a block diagram illustrating general functions of an automatic call and data transfer processing system in accordance with the present invention.

Referring to FIG. 1, a block diagram illustrating general functions of an automatic call and data transfer processing system of the present invention is shown. The present invention is an automatic call and data transfer processing machine that can be programmed by an authorized user (block 12) to process incoming telephone calls in a manner pre-determined by such user. Although the present invention may be employed to process any voice data that may be received through digital or analog channels, as well as data received electronically and otherwise convertible into readable text (to be further explained below), one embodiment of the present invention involves the processing of telephone communications. Particularly, the system 10 will automatically answer an incoming telephone call from a caller (block 14) and, depending upon the manner in which the system 10 is programmed by the user (block 12), the system 10 may process the telephone call by, for example, switching the call to another telecommunication system or to an answering machine (Block 18), or by handling the call directly, e.g., by connecting, disconnecting or placing the caller on hold (Block 16). In addition, the system 10 may be programmed to route an incoming telephone call to various telecommunication systems in a specific order (e.g., directing the call to several pre-determined telephone numbers until such call is answered) or simultaneously to all such systems. It is to be understood that the telecommunication systems listed in block 18, as well as the options shown in block 16 of FIG. 1, are merely illustrative, and not exhaustive, of the processing procedures that the system 10 may be programmed to perform.

In another embodiment of the present invention, the system 10 may be programmed to process incoming facsimile and e-mail messages, or automatically retrieve messages from e-mail or voice mail systems. Thus, it is to be understood that the bidirectional lines of FIG. 1 connecting the system 10 to the telecommunication systems in block 18 (e.g., e-mail, voice mail, facsimile/modem and answering machine) indicates that the system 10 is designed to send data (e.g., calls or messages) to such systems, as well as retrieve and process data stored or recorded in such systems. For instance, the system 10 may be programmed to process a particular call by directing the call to an answering machine (block 18) to be recorded. The system 10 may subsequently retrieve the recorded message from the answering machine, which is then decoded and processed by the system 10 in a particular manner. Further, the system 10 can be programmed to transform an incoming telephone call or messages into a page which can then be transmitted to the user's pager, cellular phone or e-mail.

The functional modules of the system 10 and their specific interaction in accordance with an embodiment of the present invention will be explained below by reference to FIG. 2. It is to be understood that same or similar components illustrated throughout the figures are designated with the same reference numeral. It is to be further understood that the functional modules described herein in accordance with the present invention may be implemented in hardware, software, or a combination thereof. Preferably, the main speech and speaker recognition, language identification modules and indexing modules of present invention, for example, are implemented in software on one or more appropriately programmed general purpose digital computer or computers, each having a processor, associated memory and input/output interfaces for executing the elements of the present invention. It should be understood that while the invention is preferably implemented on a suitably programmed general purpose computer or computers, the functional elements of FIG. 2 may be considered to include a suitable and preferred processor architecture for practicing the invention and are exemplary of functional elements which may be implemented within such computer or computers through programming. Further, the functional elements of FIG. 2 may be implemented by programming one or more general purpose microprocessors. Of course, special purpose microprocessors may be employed to implement the invention. Given the teachings of the invention provided herein, one of ordinary skill in the related art will be able to contemplate these and similar implementations of the elements of the invention.

Figure 2:
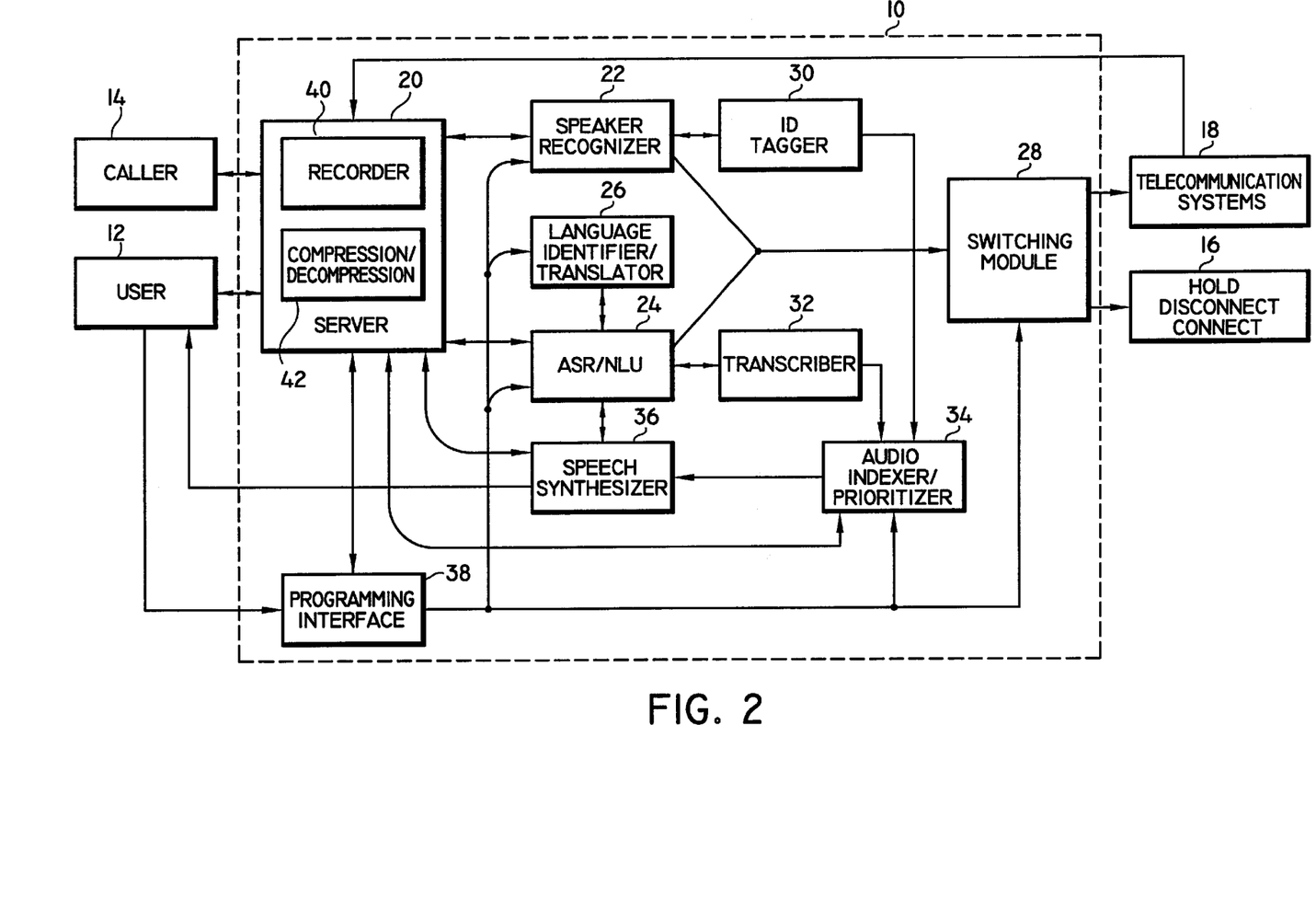
FIG. 2 is a block diagram, as well as a flow diagram, illustrating the functional interconnection between modules for a call and data transfer processing system in accordance with an embodiment of the present invention.

Referring now to FIG. 2, the system 10 includes a server 20 preferably connected to various telecommunication systems including, but not limited to, one or more telephone lines (block 14) and one or more facsimile and a modem lines (FIGS. 1 and 2, block 18) for receiving and sending telephone calls and message data, respectively. The server 20 is programmed to automatically answer incoming telephone calls and receive incoming facsimile transmissions. The system 10 may also include a permanent internet/intranet connection for accessing a local network mail server, whereby the server 20 can be programmed to periodically connect to such local network mail server (via TCP/IP) to receive and process incoming e-mails, as well as send e-mail messages. Alternatively, if the system 10 is not permanently connected to a local network server, the system server 20 may be programmed to periodically dial an access number to an internet provider to retrieve or send e-mail messages. Such procedures may also be performed at the option of the user (as opposed to automatically monitoring such e-mail accounts) when the user accesses the system 10.

Further, as shown in FIGS. 1 and 2 (block 18), the server 20 may be directly connected to voice mail systems and answering machines so as to allow the user to retrieve and process messages that have been recorded on such voice-mail and answering machine systems. If the system 10 is connected to a local network system, the server 20 may be programmed to periodically retrieve messages from other voice mail systems or answering machines which are not directly connected to the server 20, but otherwise accessible through the local network, so that the system 10 can then automatically monitor and retrieve messages from such voice mail systems or answering machines.

The server 20 includes a recorder 40 for recording and storing audio data (e.g., incoming telephone calls or messages retrieved from voice mail or answering machines), preferably in digital form. Furthermore, the server 20 preferably includes a compression/decompression module 42 for compressing the digitized audio data, as well as message data received via e-mail and facsimile, so as to increase the data storage capability of a memory (not shown) of the system 10 and for decompressing such data before reconstruction when such data is retrieved from memory.

A speaker recognizer module 22 and an automatic speech recognizer/natural language understanding (ASR/NLU) module 24 are operatively coupled to the server 20. The speaker recognizer module 22 determines the identity of the caller 14 and participants to a conference call from the voice data received by the server 20, as well as the author of a received facsimile or e-mail message. The ASR/NLU module 24 converts voice data and other message data received from the server 20 into readable text to determine the content and subject matter of such calls, conversations or messages. In addition, as further demonstrated below, the ASR/NLU module 24 processes verbal commands from an authorized user to remotely program the system 10, as well as to generate or retrieve messages. The ASR/NLU module 24 also processes voice data from callers and authorized users to perform interactive voice response (IVR) functions. A language identifier/translator module 26, operatively connected to the ASR/NLU module 24, is provided so that the system 10 can understand and properly respond to messages in foreign language when the system is used, for example, in a multi-language country such as Canada.

A switching module 28, operatively coupled to the speaker recognizer module 22 and the ASR/NLU module 24, processes data received by the speaker recognizer module 22 and/or the ASR/NLU module 24. The switching module performs a processing procedure with respect to incoming telephone calls or facsimile or e-mail messages (e.g., directing a call to voice-mail or answering machine) in accordance with a pre-programmed procedure.

An identification (ID) tagger module 30, operatively connected to the speaker recognizer module 22, is provided for electronically tagging the identity of the caller to the caller's message or conversation or tagging the identity of the author of an e-mail or facsimile message. Further, when operating in the background of a teleconference, the ID tagger 30 will tag the identity of the person currently speaking. A transcriber module 32, operatively connected to the ASR/NLU module 24, is provided for transcribing the telephone message or conversation, teleconference and/or facsimile message. In addition, the transcriber module 32 can transcribe a verbal message dictated by the user, which can subsequently be sent by the system 10 to another person via telephone, facsimile or e-mail.

An audio indexer/prioritizer module 34 is operatively connected to the ID tagger module 30 and the transcriber module 32. The audio indexer/prioritizer module 34 stores the transcription data and caller identification data which is processed by the transcriber module 32 and the ID tagger module 30, respectively, as well as the time of the call, the originating phone number (via automatic number identification (ANI) if available) and e-mail address, in a pre-programmed manner, so as to allow the user to retrieve specific calls or messages from a particular party or those calls or messages which pertain to specific subject matter. Further, the audio indexer/prioritizer can be programmed to prioritize certain calls or messages and inform the user of such calls or messages.

A speech synthesizer module 36, operatively connected to the audio indexer/prioritizer module 34, allows the user to retrieve messages (e-mails or facsimiles) in audio form (i.e., synthesized speech). The speech synthesizer is also operatively coupled to the ASR/NLU module for providing system prompts (i.e., queries) in the form of synthesized speech (as opposed to being displayed, for example, on a computer monitor).

A programming interface 38, operatively coupled to the server 20, speaker recognizer module 22, language identifier/translator module 26, ASR/NLU module 24, audio indexer/prioritizer module 34 and the switching module 28, is provided for programming the system 10 to process calls and messages in accordance with a pre-determined procedure. As explained in detail below, a user may program the system 10 using the programming interface 38 through either voice commands or a GUI (graphical user interface), or both. In a preferred embodiment, the system 10 is programmed by verbal commands from the user (i.e., voice command mode). Specifically, the user may program the system 10 with verbal commands either remotely, by calling into the system 10, or locally with a microphone. The programming interface 38 is connected to the server 20 which, in conjunction with the speaker recognizer module 22 and the ASR/NLU module 24, verifies the identity of the user before processing the verbal programming commands of the user. The system 10 may either display (via the GUI) or play back (via the speech synthesizer 36) information relating to the verbal programming commands (i.e., whether the system 10 recognizes such command), as well as the current programming structure of the system 10.

In another embodiment, the system 10 may be programmed locally, through a PC and GUI screen, or programmed remotely, by accessing the system 10 through a computer network from a remote location. Similar to conventional windows interface, the user may program the system 10 by selecting certain fields which may be displayed on the GUI. It is to be appreciated that the system 10 may be programmed through a combination of voice commands and a GUI. In such a situation, the GUI may, for example, provide assistance to the user in giving the requisite voice commands to program the system 10. Still further, the system 10 may be programmed by editing a corresponding programming configuration file which controls the functional modules of FIG. 2.

Figure 3A:
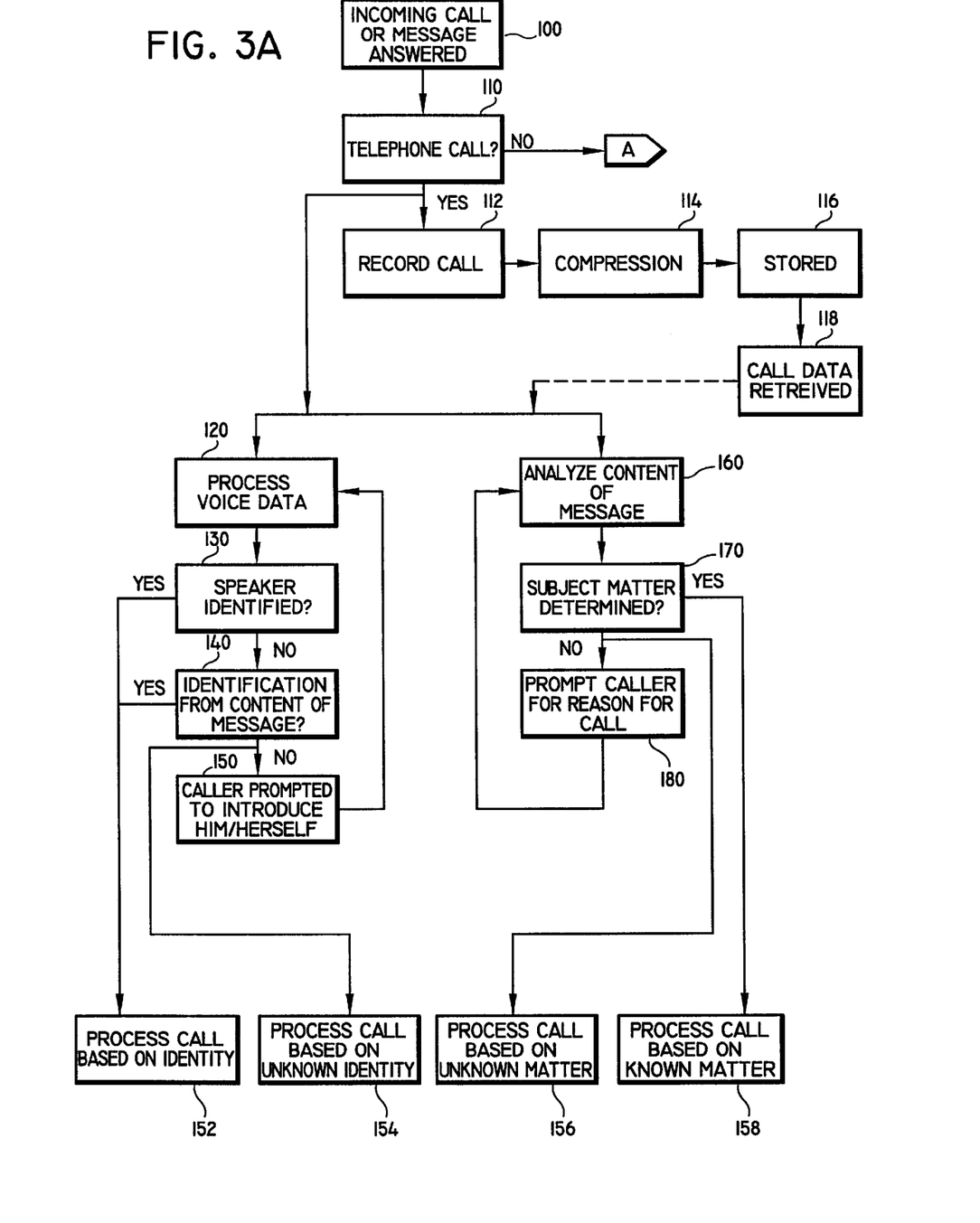
FIGS. 3a and 3b are flow diagrams illustrating a method for call or data transfer processing in accordance with the present invention.

The operation of the present invention will now be described with reference to FIG. 2 and FIGS. 3a and 3b. It is to be understood that the depiction of the present invention in FIG. 2 could be considered a flow chart for illustrating operations of the present invention, as well as a block diagram showing an embodiment of the present invention. The server 20 is programmed to automatically answer an incoming telephone call, e-mail, facsimile/modem, or other electronic voice or message data (step 100). The server 20 distinguishes between incoming telephone calls, e-mail messages, facsimile messages, etc., by special codes, i.e. protocols, at the beginning of each message which indicates the source. Particularly, the server 20 initially assumes that the incoming call is a telephone communication and will proceed accordingly (step 110) unless the server 20 receives, for example, a modem handshake signal, whereby the system 10 will handle the call as a computer connection protocol. It is to be understood that the system 10 may be programmed to monitor other voice mail or e-mail accounts by periodically calling and retrieving voice mail and e-mail messages from such accounts.

If it is determined that the incoming call received by the server 20 is a telephone call, the audio data (e.g., incoming calls as well as calls retrieved from voice mail or answering machines) is recorded by the recorder 40 (step 112). The recorder 40 may be any conventional device such as an analog recorder or digital audio tape ("DAT"). Preferably, the recorder 40 is a digital recorder, i.e., an analog-to-digital converter for converting the audio data into digital data. The digitized audio data may then be compressed by the compression/decompression module 42 (step 114) before being stored (step 116) in memory (not shown in FIG. 2). It is to be appreciated that any conventional algorithm, such as those disclosed in "Digital Signal Processing, Synthesis and Recognition" by S. Furui, Dekker, 1989, may be employed by the compression/decompression module 42 to process the message data.

Next, simultaneously with the recording and storing of the audio data, the identity of the caller is determined by processing the caller's audio communications and/or audio responses to queries by the system 10. Specifically, the caller's verbal statements and responses are received by the server 20 and sent to speaker recognizer module 22, wherein such verbal statements and responses are processed and compared with previously stored speaker models (step 120). If the speaker is identified by matching the received voice data with a previously stored voice model of such speaker (step 130), and if the system 10 is pre-programmed to process calls based on the identity of a caller, the system 10 will then process the telephone call in accordance with such pre-programmed procedure (step 152).

If, on the other hand, the speaker (e.g., a first time caller) cannot be identified via the previously stored voice models, speaker identification may be performed by both the speaker recognizer module 22 and the ASR/NLU module 26, whereby the content of the telephone message may be processed by the ASR/NLU module 26 to extract the caller's name which is then compared with previously stored names to determine the identity of such caller (step 140). If the identity of the caller is then determined, the system 10 will process the telephone call in accordance with the identity of the caller (step 152).

In the event that the system 10 is unable to identify the caller from either the stored voice models or the content of the telephone message, the speaker recognizer module 22 sends a signal to the server 20 which, in turn, prompts the caller to identify him or herself with a query, e.g., "Who are you," (step 150) and the above identification process is repeated (step 120). The server 20 obtains the query in synthesized speech from speech synthesizer module 36. It is to be understood that, as stated above, the system 10 may be programmed to initially prompt the caller to identify him or herself or ask details regarding the reason for the call.

Once the caller or author has been identified by the speaker recognizer module 22, a signal is sent by the speaker recognizer module 22 to the switching module 28, whereby the switching module 28 processes the call or message based on the identity of the caller or author in accordance with a pre-programmed procedure (step 152). If, on the other hand, the identity of the caller ultimately cannot be identified, the system 10 may be programmed to process the call based on an unknown caller (step 154) by, e.g., forwarding the call to a voice mail. Such programming, to be further explained, is performed by the user 12 through the programming interface module 38. As stated above, the processing options which the system 10 may be programmed to perform include, but are not limited to, switching the call to another system, directing the call to another telecommunication terminal (FIGS. 1 and 2, block 18) or directly handling the call by either connecting the call to a particular party, disconnecting the call, or placing the call on hold (FIGS. 1 and 2, block 16).

It is to be appreciated that whenever a new caller interacts with the system 10 for the first time, speaker models are built and stored in the speaker recognizer module 22, unless erased at the option of the user. Such models are then utilized by the speaker recognizer module 22 for identification and verification purposes when that caller interacts with the system 10 at a subsequent time.

It is to be appreciated that the system 10 may perform speaker identification by utilizing methods other than acoustic features when the requisite voice models do not exist. For example, with regard to telephone calls, the system 10 may utilize additional information (e.g. caller ID) to enhance the accuracy of the system 10 and/or to identify first time callers.

As further explained below, the system 10 may be programmed to store the name and originating telephone number of every caller (or specified callers). Such capability allows the user to automatically send reply messages to callers, as well as dynamically create an address book (which is stored in the system 10) which can be subsequently accessed by the user to send a message to a particular person.

It is to be understood that depending upon the application, it is not necessary that the system 10 perform speaker recognition and natural language understanding in real time (i.e., simultaneously with the recording and during the time period of the actual telephone call) in every instance. For example, the system 10 can be programmed to query the caller (via IVR programming) to obtain relevant information (i.e., name and reason for call) at the inception of the call and store such information. The identification process may then be performed by the speaker recognizer module 22 or the ASR/NLU module 24 subsequent to the call by retrieving the stored audio data from memory (step 118) (as indicated by the dotted line in FIG. 3a).

It is to be understood that any type of speaker recognition system may be utilized by the speaker recognizer module 22 for identifying the caller. Preferably, the speaker recognition system employed in accordance with the present invention is the system which performs text-independent speaker verification and asks random questions, i.e., a combination of speech recognition, text independent speaker recognition and natural language understanding as disclosed in U.S. Ser. No. 08/871,784, filed on Jun. 11, 1997, and entitled: "Apparatus And Methods For Speaker Verification/Identification/Classification Employing Non-Acoustic And/Or Acoustic Models and Databases," U.S. Pat. No. 5,897,616 the disclosure of which is incorporated herein by reference. More particularly, the text-independent speaker verification system is preferably based on a frame-by frame feature classification as disclosed in detail in U.S. Ser. No. 08/788,471 filed on Jan. 28, 1997 and entitled: "Text Independent Speaker Recognition for Transparent Command Ambiguity Resolution And Continuous Access Control," U.S. Pat. No. 6,073,101 the disclosure of which is also incorporated herein by reference.

As explained in the above-incorporated reference U.S. Ser. No. 08/871,784, text-independent speaker recognition is preferred over text-dependant or text-prompted speaker recognition because text independence allows the speaker recognition function to be carried out in parallel with other speech recognition-based functions in a manner transparent to the caller without requiring interruption for new commands or identification of a new caller whenever a new caller is encountered.

Figure 3B:
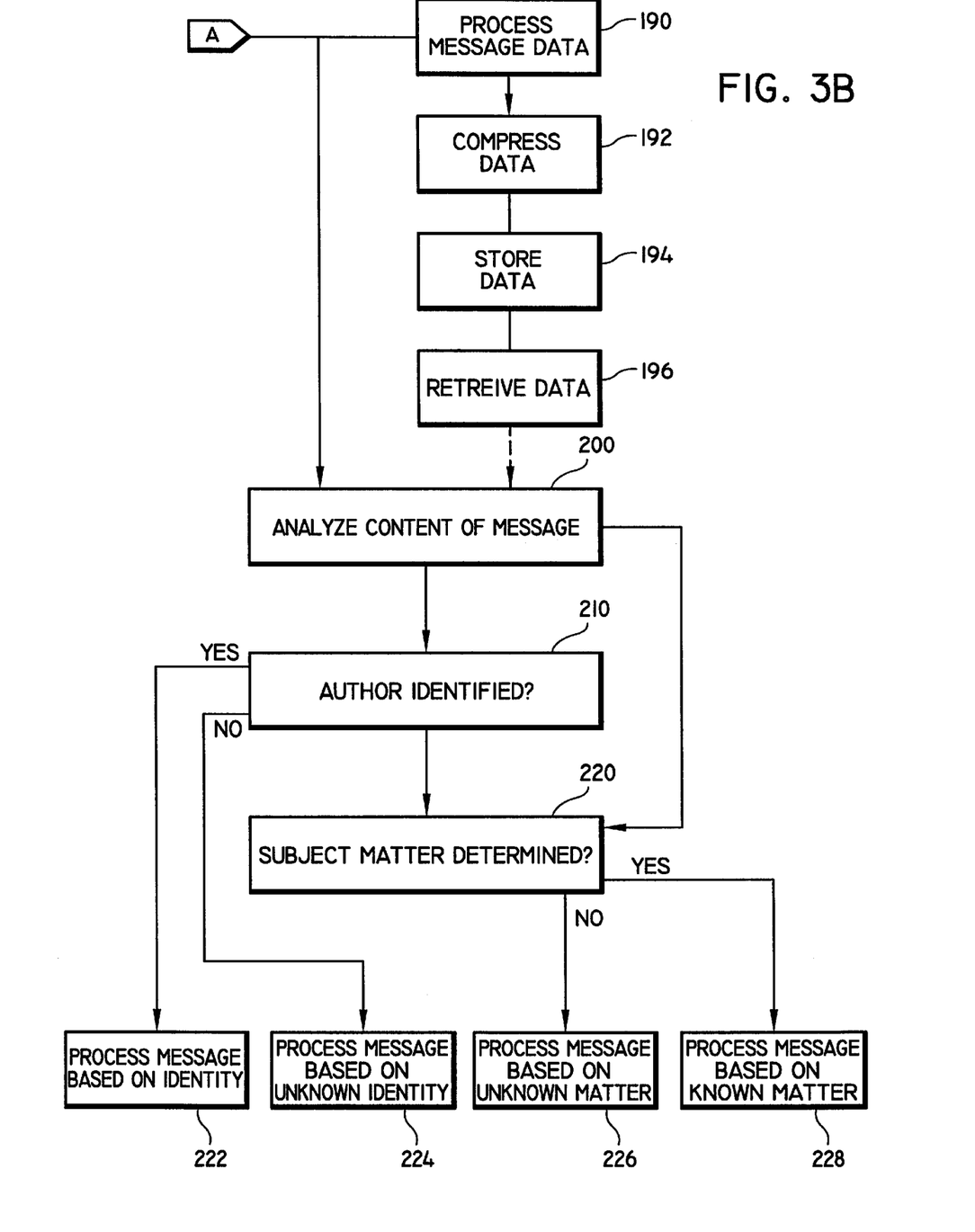

Next, referring to FIG. 3b (and assuming the system 10 is programmed to process calls based on the identity of a caller or author), if it is determined that the incoming call is a facsimile or e-mail message, the message data (e.g., incoming e-mails or messages retrieved from e-mail accounts) are processed by the ASR/NLU module 24 (step 190), compressed (step 192), and stored (step 194) in memory (not shown). With regard to e-mail messages, the data is directly processed (since such data is already in text format). With regard to facsimile messages, the ASR/NLU module 24 employs optical character recognition (OCR) using known techniques to convert the received facsimile message into readable text (i.e., transcribe the facsimile message into an ASCII file).

Next, simultaneously with the transcribing and storing of the incoming message data, the identity of the author of such message may be determined via the ASR/NLU module 24 whereby the content of the incoming message is analyzed (step 200) to extract the author's name or the source of the message, which is then compared with previously stored names to determine the identity of such author (step 210). If the author is identified (step 210), the message can be processed in accordance with a pre-programmed procedure based on the identity of the author (step 222). If, on the other hand, the identity of the author cannot be identified, the message may be processed in accordance with the pre-programmed procedure for an unidentified author (step 224).

As stated above, it is to be understood that it is not necessary that the system 10 process the incoming or retrieved message in real time (i.e., simultaneously with the transcribing of the actual message) in every instance. Processing may be performed by the ASR/NLU module 24 subsequent to receiving the e-mail or facsimile message data by retrieving the transcribed message data from memory (step 196) (as indicated by the dotted line in FIG. 3*b*).

In addition to the identity of the caller or author, the system 10 may be further programmed by the user 12 to process an incoming telephone call or facsimile or e-mail message based on the content and subject matter of the call or message and/or the time of day in which such call or message is received. Referring again to FIGS. 2, 3*a* and 3*b*, after receiving an incoming telephone call or e-mail or facsimile message, or after retrieving a recorded message from an answering machine or voice mail, the server 20 sends the call or message data to the ASR/NLU module 24. In the case of voice data (e.g. telephone calls or messages retrieved from voice mail or answering machine), the ASR/NLU module 24 converts such data into symbolic language or readable text. As stated above, e-mail messages are directly processed (since they are in readable text format) and facsimile messages are converted into readable text (i.e., ASCII files) via the ASR/NLU module 26 using known optical character recognition (OCR) methods. The ASR/NLU module 26 then analyzes the call or message data by utilizing a combination of speech recognition to extract certain keyword or topics and natural language understanding to determine the subject matter and content of the call (step 160 in FIG. 3*a* for telephone calls) or message (step 200 in FIG. 3*b* for e-mails and facsimiles).

Once the ASR/NLU module determines the subject matter of the call (step 170 in FIG. 3*a*) or the message (step 220 in FIG. 3*b*), a signal is then sent to the switching module 28 from the ASR/NLU module 24, wherein the call or message is processed in accordance with a pre-determined manner based on the subject matter and content of the call (step 158 in FIG. 3*a*) or the content of the message (step 228 in FIG. 3*b*). For instance, if a message or call relates to an emergency or accident, the switching module 28 may be programmed to transfer the call immediately to a certain individual.

In the event that the ASR/NLU module 24 is unable to determine the subject matter or content of a telephone call, the ASR/NLU module 24 sends a signal to the speech synthesizer 36 which, in turn, sends a message to the server 20, to prompt the caller to articulate in a few words the reason for the call (step 180), e.g., "What is the reason for your call?". Again, it is to be understood that the system 10 may be programmed to initially prompt the caller to state the reason for the call. If the system 10 is still unable to determine the subject matter of such call, the call may be processed in accordance with a pre-programmed procedure based on unknown matter (step 156). Likewise, if the subject matter of an e-mail or facsimile message cannot be determined (step 220), the message may be processed in accordance with a pre-programmed procedure based on unknown matter (step 226).

Further, in the event that an incoming call or e-mail message is in a language foreign to the system 10 (i.e., foreign to the user), the ASR/NLU module 26 will signal the language identifier/translator module 26 to identify the particular language of the call or message, and then provide the required translation to the ASR/NLU module 26 so as to allow the system 10 to understand the call and answer the caller in the proper language. It is to be understood that the system 10 may also be pre-programmed to process calls or messages with an unknown language in a particular manner.

It is to be appreciated that any conventional technique for language identification and translation may be employed in the present invention, such as the well-known machine language identification technique disclosed in the article by Hieronymus J. and Kadambe S., "Robust Spoken Language Identification using Large Vocabulary Speech Recognition," Proceedings of *ICASSP* 97, Vol. 2 pp. 1111, as well as the language translation technique disclosed in Hutchins and Somers (1992): "An Introduction to Machine Translation," Academic Press, London; (encyclopedic overview).

In addition to the above references, language identification can be performed using several statistical methods. First, if the system 10 is configured to process a small number of different languages (e.g., in Canada where essentially only English or French are spoken), the system 10 may decode the input text in each of the different languages (using different ASR systems). The several decoded scripts are then analyzed to find statistical patterns (i.e., the statistical distribution of decoded words in each script is analyzed). If the decoding was performed in the wrong language, the perplexity of the decoded script would be very high, and that particular language would be excluded from consideration.

Next, language identification may be performed on a phonetic level where the system recognizes a set of phonemes (either using a universal phonetic system or several systems for different languages). The system then estimates the frequencies of the decoded phoneme sequences for each language. If a particular decoded sequence is unusual, the system would exclude such language from consideration. There may also be some sequences which are typical for a certain language. Using such factors, the system will identify the most probable language.

It is to appreciated that the present invention may utilize the identity of the caller to perform language identification. Specifically, if the speaker profile of a certain caller (which is stored in the system 10) indicates that the caller speaks in a certain language, this information may be a factor in identifying the language. Conversely, if the system 10 identifies a particular language using any of the above methods, the system 10 may then determine the identity of a caller by searching the speaker profiles to determine which speakers use such identified language.

It is to be understood that both speech recognition and natural language understanding may be utilized by the ASR/NLU module 24 to process data received from the server 20. The present invention preferably employs the natural language understanding techniques disclosed in U.S. Ser. No. 08/859,586, filed on May 20, 1997, and entitled: "A Statistical Translation System with Features Based on Phrases or Groups of Words," and U.S. Ser. No. 08/593,032, filed on Jan. 29, 1996 and entitled "Statistical Natural Language Understanding Using Hidden Clumpings," the disclosures of which are incorporated herein by reference. The above-incorporated inventions concern natural language understanding techniques for parameterizing (i.e. converting) text input (using certain algorithms) into language which can be understood and processed by the system 10. For example, in the context of the present invention, the ASR component of the ASR/NLU module 24 supplies the NLU component of such module with unrestricted text input such as "Play the first message from Bob." Such text may be converted by the NLU component of the ASR/NLU module 24 into "retrieve-message(sender=Bob, message-number=1)." Such parameterized action can then be understood and acted upon by the system 10.

The known automatic speech recognition functions disclosed in the article by Zeppenfeld, et al., entitled "Recognition of Conversational Telephone Speech Using The Janus Speech Engine," Proceedings of *ICASSP* 97, Vol. 3, pp. 1815 1997; and the known natural language understanding functions disclosed in the article by K. Shirai and S. Furui, entitled "Special Issue on Spoken Dialog," 15, (3–4) Speech Communication, 1994 may also be employed in the present invention. Further, to simplify the programming of the ASR/NLU module 24, the keyword spotting based recognition methods as disclosed in "Word Spotting from Continuous Speech Utterances," Richard C. Cross, Automatic Speech and Speaker Recognition, Advanced Topics, pp. 303–327, edited by Chin-Hui Lee, Frank K. Soong, Kuldip K. Paiwal (Huwer Academic Publishers), 1996 may preferably be used to guarantee that certain critical messages are sufficiently handled.

It is to be appreciated that by utilizing natural language understanding, as demonstrated above, the system 10 is capable of performing interactive voice response (IVR) functions so as to establish a dialog with the user or caller to provide dialog management and request understanding. This enables the system 10 to be utilized for order taking and dialog-based form filing. Further, such functions allow the caller to decide how to process the call (assuming the system 10 is programmed accordingly), i.e., by leaving an e-mail or voice mail message, sending a page or transferring the call to another telephone number. In addition, to be explained below, this allows the system 10 to be remotely programmed by the user through voice commands.

It is to be further appreciated that the system 10 provides security against unauthorized access to the system 10. Particularly, in order for a user to have access to and participate in the system 10, the user must go through the system's enrollment process. This process may be effected in various ways. For instance, enrollment may be performed remotely by having a new user call and enter a previously issued personal identification number (PIN), whereby the server 20 can be programmed to respond to the PIN which is input into the system 10 via DTMF Keys on the new user's telephone. The system 10 can then build voice models of the new user to verify and identify the new user when he or she attempts to access or program the system 10 at a subsequent time. Alternatively, either a recorded or live telephone conversation of the new user may be utilized to build the requisite speaker models for future identification and verification.

It is to be appreciated that the server 20 of the present invention may be structured in accordance with the teachings of patent application (IBM Docket Number Y0997-313) entitled "Apparatus and Methods For Providing Repetitive Enrollment in a Plurality of Biometric Recognition Systems Based on an Initial Enrollment," the disclosure of which is incorporated by reference herein, so as to make the speaker models (i.e., biometric data) of authorized users (which are stored in the server 20) available to other biometric recognition based systems to automatically enroll the user without the user having to systematically provide new biometric models to enroll in such systems.

The process of programming the system 10 can be performed by a user either locally, via a GUI interface or voice commands, or remotely, over a telephone line (voice commands) or through a network system connected to the system. In either event, this is accomplished through the programming interface 38. As demonstrated above, programming the system 10 is achieved by, e.g., selecting the names of persons who should be transferred to a certain number, voice mail or answering machine, by inputting certain keywords or topics to be recognized by the system 10 as requiring certain processing procedures and/or by programming the system 10 to immediately connect emergency calls or business calls between the hours of 8:00 a.m. and 12:00 p.m. As shown in FIG. 2, the programming interface 38 sends such information to the server 20, speaker recognizer module 22, ASR/NLU module 26, language identifier/translator module 24, audio indexer/prioritizer module 34 and the switching module 28, which directs the system 10 to process calls in accordance with the user's programmed instructions.

The programming interface is responsive to either DTMF key signal or voice commands by an authorized user. The preferred method of programming the system 10 is through voice activated commands via a process of speech recognition and natural language understanding, as opposed to DTMF keying or via GUI interface. This process allows the system 10 to verify and identify the user before the user is provided access to the system 10. This provides security against unauthorized users who may have knowledge of an otherwise valid PIN. Specifically, before the user can program the system 10 through voice commands, the user's voice is first received by server 20, and then identified and verified by the speaker recognizer module 22. Once the user's identification is verified, the server 20 will signal the programming interface 38 to allow the user to proceed with programming the system 10.

The voice commands for programming the system 10 are processed in the ASR/NLU module 24. Particularly, during such programming, the ASR/NLU module 24 is in a command and control mode, whereby every voice instruction or command received by the programming interface 38 is sent to the ASR/NLU module 24, converted into symbolic language and interpreted as a command. For instance, if the user wants the system 10 to direct all calls from his wife to his telephone line, the user may state, e.g., "Immediately connect all calls from my wife Jane," and the system 10 will recognize and process such programming command accordingly.

Moreover, the user can establish a dialog with the system 10 through the ASR/NLU module 24 and the speech synthesizer module 35. The user can check the current program by asking the programming interface 38, e.g., "What calls are transferred to my answering machine." This query is then sent from the server 20 (if the user is calling into the system 10 from an outside line), or from the programming interface 28 via the server 20 (if the user is in the office), to the ASR/NLU module 24, wherein the query is processed. The ASR/NLU 24 module will then generate a reply to the query, which is sent to the speech synthesizer 36 to generate a synthesized message, e.g., "All personal calls are directed to your answering machine," which is then played to the user.

Similarly, if the system 10 is unable to understand a verbal programming request from an authorized user, the ASR/NLU module 24 can generate a prompt for the user, e.g., "Please rephrase your request," and processed by the speech synthesizer 36. Specifically, during such programming, the server 20 sends a programming request to the programming interface 38. If the system 10 is unable to decipher the request, the programming interface 38 sends a failure message back to the server 20, which relays this message to the ASR/NLU module 24. The ASR/NLU module 24 may then either reprocess the query for a potential different meaning, or it can prompt the user (via the speech synthesizer 36) to issue a new programming request.

It is to be appreciated that the system 10 may be programmed to manage various messages and calls received via voice-mails, telephone lines, facsimile/modem, e-mail and other telecommunication devices which are connected to the system 10 through the operation of the audio indexer/prioritizer module 34. In particular, the audio indexer/prioritizer module 34 may be programmed to automatically sort and index such messages and telephone conversations according their subject matter and content, origin, or both. The system 10 can preferably be further programmed so as to prioritize certain calls and messages from a specific individual.

Referring to FIG. 2, the audio indexing feature of the system 10 works as follows. Once the caller is identified and verified by the speaker recognizer module 22, the speaker recognizer module 22 signals the ID tagger module 30 which automatically tags the identity of the caller or the identity of current speaker of a group of participants to a teleconference. Simultaneously with the ID tagging process, the transcriber module 32 transcribes the telephone conversation or message. The tagging process involves associating the transcribed message with the identity of the caller or speaker. For instance, during teleconferences, each segment of the transcribed conversation corresponding to the current speaker is tagged with the identity of such speaker together with the begin time and end time for each such segment.

The information processed in the ID tagger module 30 and the transcriber module 32 is sent to the audio indexer/prioritizer module 34, wherein the received information is processed and stored according to a pre-programmed procedure. The audio indexer/prioritizer module 34 can be programmed to index the messages and conversations in any manner that the user desires. For instance, the user may be able to either retrieve the messages from a certain caller, retrieve all urgent messages, or retrieve the messages that relate to a specific matter. Further, the audio indexer/prioritizer module 34 can be programmed to prioritize calls from a caller who has either left numerous messages or has left urgent messages.

The information stored in the audio indexer/prioritizer module 36 can then be accessed and retrieved by the user either locally or remotely. When such information is accessed by the user, the audio indexer/prioritizer module 36 send the requested information to the speech synthesizer module 38, wherein a text-to-speech conversion is performed to allow the user to hear the message in the form of synthesized speech. It is to be understood that any conventional speech synthesizing technique may be utilized in the present invention such as the Eloquent engine provided with the commercially available IBM VIAVOICEGOLD software.

It is to be appreciated that information may be retrieved from the audio indexer/prioritizer module 34 through various methods such as via GUI interface, PINs and DTMF keying. The preferred method in the present invention for retrieving such information, however, is through voice activated commands. Such method allows the system 10 to identify and verify the user before providing access to the messages or conversations stored and indexed in the audio indexer/prioritizer module 34. The audio indexer/prioritizer module 34 can be programmed to recognize and respond to certain voice commands of the user, which are processed by the ASR/NLU module 24 and sent to the audio indexer/prioritizer module 34, in order to retrieve certain messages and conversations. For example, the user may retrieve all the messages from Mr. Smith that are stored in the audio indexer/prioritizer module 36 through a voice command, e.g., "Play all messages from Mr. Smith." This command is received by the server 20 and sent to the ASR/NLU module 24 for processing. If the ASR/NLU module 24 understands the query, the ASR/NLU MODULE 24 sends a reply back to the server 20 to process the query. The server 20 then signals the indexer/prioritizer module 34 to send the requested messages to the speech synthesizer to generate synthesized e-mail or facsimile messages, or directly to the server 20 for recorded telephone or voice mail messages, which are simply played back.

It is to be appreciated that various alternative programming strategies to process calls may be employed in the present invention by one of ordinary skill in the art. For instance, the system 10 may be programmed to warn the user in the event of an important or urgent incoming telephone call. Specifically, the system 10 can be programmed to notify the user on a display thereby allowing the user to make his own decision on how to handle such call, or to simply process the call, as demonstrated above, in accordance with a pre-programmed procedure. Moreover, the system 10 can be programmed to forward an urgent or important call to the user's beeper when the user is not home or is out of the office. The user may also program the system 10 to dial a sequence of telephone numbers (after answering an incoming telephone call) at certain locations where the user may be found during the course of the day. Furthermore, the sequence (i.e., list) of pre-programmed telephone numbers may be automatically updated by the system 10 in accordance with the latest known location where the user is found. If the user desires, such list may also accessible by individuals who call into the system 10 so that such callers can attempt to contact the user at one of the various locations at their convenience.

In addition, it is to be appreciated that the system 10 may be programmed to store the names of all persons who call the system 10, together with their telephone numbers (using ANI), as well as e-mail addresses of persons who send electronic mail. This allows the user of the system 10 to automatically reply to pending calls or messages without having to first determine the telephone number or e-mail addresses of the person to whom the user is replying.

Further, such programming provides for dynamically creating a continuously up-to-date address book which is accessible to an authorized user to send messages or make calls. Specifically, the user can access the system 10, select the name of a particular person to call, and then command the system 10 to send that person a certain message (e.g., e-mail or facsimile).

Furthermore, the system 10 may be programmed to allow the callers to access and utilize specific functions of the system 10. For instance, the system 10 may offer the caller the option to schedule a tentative appointment with the user, which may then be stored in the system 10 and then subsequently accepted or rejected by the user. The caller may also be afforded the opportunity to chose the method by which the user may confirm, reject or adjourn such appointment (e.g., telephone call, facsimile or e-mail). Additionally, the system 10 may be programmed to provide certain authorized caller with access to the user's appointment calendar so that such appointments may be easily scheduled.

It is to be further appreciated that the present invention may be employed in a small scale application for personal home use, or employed in a large scale office or corporate applications. It is to be further appreciated by one of ordinary skill in the art that the system 10 may be utilized in other applications. For instance, by utilizing the NLU feature of the system 10, the system 10 may be connected to devices such as tape recorders, radios and televisions so as to warn the user whenever a certain topic is being covered on some channel or if a particular person is being interviewed. It is to be understood that the system 10 is not limited to telephone communications. It is possible to use the system 10 for web phones, net conversations, teleconferences and other various voice communications which involve the transmission of voice through a digital or analog channel. Additional electronic information such as ASCII characters, facsimile messages and the content of web pages and database searches can also be processed in the same manner. For example, by adding optical character recognition (OCR) with facsimile receiving capabilities, the system 10 is able to transcribe the content of messages received by facsimile or email to be stored in the audio indexer/prioritizer 34. As demonstrated above, the user may then retrieve these messages through the speech synthesizer 36 to hear the content of such messages.

In sum, the present invention provides a programmable call and message processing system which can be programmed by a user to process incoming telephone calls, e-mails messages, facsimile messages and other electronic information data in a pre-determined manner without the user having to first manually answer a telephone call or retrieve an e-mail or facsimile message, identify the caller or the author of the message, and then decide how to transfer such call or respond to such message. The present invention can be programmed to transcribe telephone conversations or teleconferences, tag the identity of the caller or participants to the teleconference, and store such messages and conversations according to the identity of the caller or author and/or the subject matter and content of the call or message. The user may then retrieve any stored message or conversation based on the identity of the caller or a group of related messages based on their subject matter.

Although illustrative embodiments of the present invention have been described herein with reference to the accompanying drawings, it is to be understood that the invention is not limited to those precise embodiments, and that various other changes and modifications may be effected therein by one skilled in the art without departing from the true scope and spirit of the invention.

What is claimed is:

1. An automatic call and data transfer processing system, comprising:
   server means for receiving an incoming call;
   speaker recognition means, operatively coupled to said server means, for identifying a caller of said call;
   speech recognition means, operatively coupled to said server means, for determining subject matter and content of said call;
   switching means, responsive to said speaker recognition means and speech recognition means, for processing said call in accordance with said identification of said caller and determined subject matter; and
   programming means, operatively coupled to said server means, said speaker recognition means, said speech recognition means and said switching means for allowing a user to program said system.

2. The system of claim 1, wherein the server means includes means for recording said incoming call.

3. The system of claim 2, wherein said server means further includes means for compressing and storing said recorded data and means for decompressing said compressed data.

4. The system of claim 1, wherein said server means further receives, and is responsive to, one of an incoming facsimile message, e-mail message, voice data, data convertible to text and a combination thereof.

5. The system of claim 1, wherein said speaker recognition means is based on text-independent speaker recognition.

6. The system of claim 1, wherein said speech recognition means utilizes speech recognition and natural language understanding to determine said subject matter and content of said call.

7. The system of claim 1, further comprising language identification means, operatively coupled to said speech recognition means, for identifying and understanding languages of said incoming call.

8. The system of claim 7, wherein said identification means performs language translation.

9. The system of claim 7, wherein identity of said caller is determined from said identified language of said call.

10. The system of claim 7, wherein said language identification means uses identity of said caller to identify language of said call.

11. The system of claim 1, further comprising enrollment means for enrolling a new user to have access to said system.

12. The system of claim 11, wherein said enrollment means comprises self-enrollment means.

13. The system of claim 1, further comprising means for determining a time of said call and wherein said system may be further programmed to process said call in accordance with said time of said call.

14. The system of claim 1, wherein said programming means includes one of a GUI interface, a voice interface, a programming configuration file, and a combination thereof.

15. The system of claim 14, wherein said programming may be performed one of locally, remotely and a combination thereof.

16. The system of claim 1, further comprising means, responsive to said incoming call, for dynamically creating an address book.

17. The system of claim 16, further comprising means for accessing said address book to send a message to a selected person.

18. The system of claim 1, wherein said processing of said call includes transferring an incoming telephone call to a plurality of different telephone numbers one of sequentially and simultaneously.

19. The system of claim 1, further comprising means for prompting the caller to identify him/herself and the subject matter of said call.

20. The system of claim 19, wherein said prompting is performed when said system cannot determine either said identity or said subject matter of call.

21. The system of claim 19, wherein said prompting is performed when said call is received to determine said identity of said caller and subject matter of said call.

22. The system of claim 1, further comprising:

identification tagging means, responsive to said speaker recognition means, for automatically tagging said identity of said caller;

transcribing means, responsive to said speech recognition means, for transcribing a telephone conversation or message of said caller; and audio indexing means, operatively coupled to said identification tagging means and said transcribing means, for indexing said message and said conversation of said caller according to subject matter of said conversation and said message and the identity of said caller.

23. The system of claim 22 further comprising means for retrieving said indexed messages from said audio indexing means.

24. The system of claim 22, further comprising speech synthesizer means, operatively coupled to said server means, said speech recognition means and said audio indexing means, for converting information stored in said audio indexing means into synthesized speech.

25. The system of claim 22, further comprising means, operatively connected to said transcribing means, for dictating messages from a user of said system and sending said message to a selected person.

26. The system of claim 25, wherein said message may be sent by one of a facsimile, e-mail or telephone call, and a combination thereof, to said selected person.

27. The system of claim 26, further comprising means for adding mood stamps or urgency/confidentiality stamps in a header in one of said facsimile and e-mail.

28. A method for providing automatic call or message data processing, comprising the steps of:

receiving an incoming call;

determining the identity of said caller;

determining the subject matter of said call;

processing said call in accordance with one of said identity of said caller and subject matter of said call; and recording said incoming call, wherein the step of recording is performed prior to said step of determining identity of said caller.

29. The method of claim 28, wherein said step of determining said identity of said caller is performed by text-independent speaker recognition.

30. The method of claim 28, wherein said step of determining said subject matter of said call is performed by speech recognition and natural language understanding.

31. The method of claim 28, further comprising the step of translating said call into a language other than that of said call.

32. The method of claim 28, further comprising the steps of:

determining a time of said call; and processing said call based on said determined time of said call.

33. The method of claim 28, wherein the method steps are tangibly embodied as program instructions on a program storage device, wherein the program instructions are readable and executable by a machine to perform the method steps.

34. A method for providing automatic call or message data processing, comprising the steps of:

receiving one of an incoming call and message data;

identifying a caller of said call if an incoming call is received and determining subject matter of said call;

identifying an author of said message if message data is received and determining subject matter of said message;

processing one of said call and message in accordance with one of said identity of said caller and author and said subject matter of said call and message.

35. The method of claim 34, further comprising the steps of:

tagging said determined identity of one of said caller and said author;

transcribing said determined subject matter of one of said call and said message;

indexing the information resulting from said tagging and said transcribing in accordance with one of said determined subject matter, said determined identity and a combination thereof.

36. The method of claim 35, further comprising the step of retrieving said indexed information.

37. The method of claim 36, wherein the step of retrieving said indexed information is performed by voice commands.

38. The method of claim 36, wherein the step of retrieving includes converting said indexed information into synthesized speech.

39. The method of claim 34, further comprising the steps:

determining the time of one of said call and message; and processing one of said call and message in accordance with said determined time.

40. The method of claim 34, wherein the method steps are tangibly embodied as program instructions on a program storage device, wherein the program instructions are readable and executable by a machine to perform the method steps.

* * * * *